(No Model.)
H. M. CARTER.
HOG FEEDER.
No. 324,531. Patented Aug. 18, 1885.
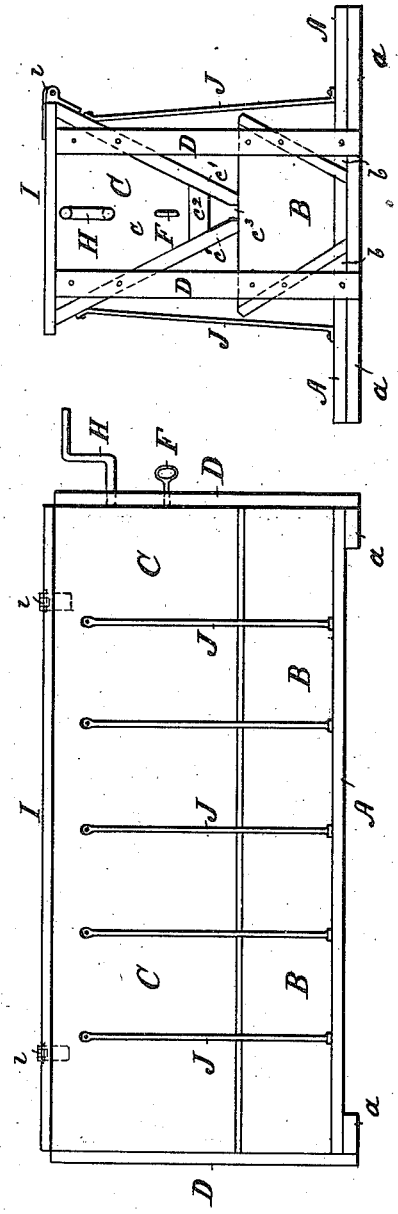
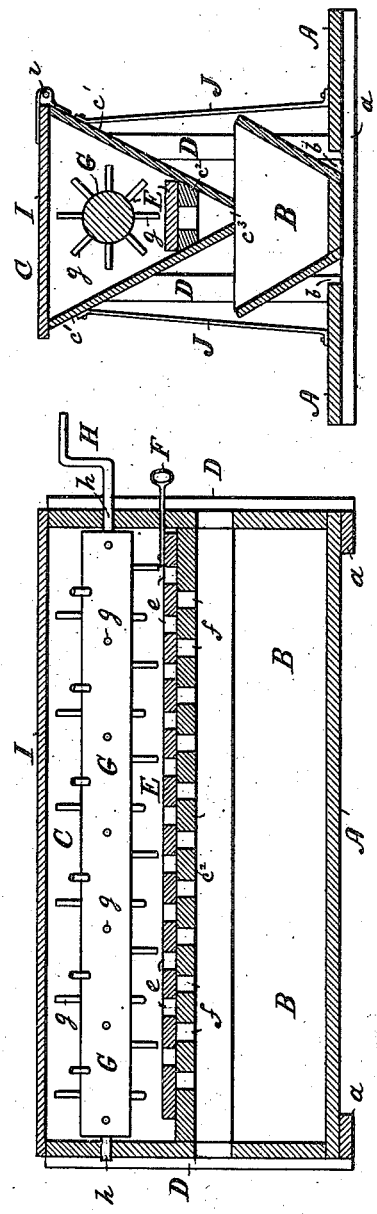
WITNESSES:
John Cook
C. Sedgwick
INVENTOR:
H. M. Carter
BY Munn & Co
ATTORNEYS.

UNITED STATES PATENT OFFICE.

HYLAND MANN CARTER, OF CINCINNATI, NEBRASKA.

HOG-FEEDER.

SPECIFICATION forming part of Letters Patent No. 324,531, dated August 18, 1885.

Application filed July 10, 1884. (No model.)

*To all whom it may concern:*

Be it known that I, HYLAND MANN CARTER, of Cincinnati, in the county of Pawnee and State of Nebraska, have invented a new and Improved Hog-Feeder, of which the following is a full, clear, and exact description.

My invention relates to improvements in hog-feeders; and it consists in the peculiar construction and arrangement of parts, as hereinafter fully described, and pointed out in the claim.

Reference is to be had to the accompanying drawings, forming part of this specification, in which similar letters of reference indicate corresponding parts in all the figures.

Figure 1 is a side elevation of the hog-feeder. Fig. 2 is an end elevation thereof. Fig. 3 is a central longitudinal sectional elevation of the feeder, and Fig. 4 is a transverse section thereof.

The letter A indicates a suitable floor or platform resting on end sills, $a\, a$, on which the feeding-trough B is supported, so as to leave spaces $b\, b$ along each side of the trough at the floor, through which spaces air may pass upward to the animals feeding from the trough.

The trough may have any approved construction. It is shown composed of a bottom, ends, and flaring sides, so that animals may feed at both sides of it.

C is the feed-holding chamber or reservoir, which is supported above the trough B by opposite pairs of posts D, which are strongly fastened to the ends of both the trough and the feed-reservoir and to the platform or floor.

The feed-reservoir is made with ends $c\, c$, fitted between sides $c'\, c'$, which converge toward the bottom $c^2$ of the reservoir. The sides $c'\, c'$ of the reservoir extend below the bottom $c^2$, and an opening, $c^3$, is left between them directly over the center of the trough B, through which the feed from the reservoir may pass to the trough when the valve E is set by its handle F, so that a series of holes, $e$, made through the valve will coincide with a series of holes, $f$, made through the bottom $c^2$ of the reservoir, and when the valve is set so that the holes $e\, f$ are out of line, as in Fig. 3, none of the feed can escape to the trough, as will readily be understood.

G is a cylinder, which is armed with numerous teeth or pins, $g$, and is mounted in the center of the reservoir, and lengthwise of the same, on suitable gudgeons or shafts, $h\, h$, journaled in the ends of the reservoir. One of the shafts $h$ has a crank, H, formed on or attached to it, whereby the toothed cylinder G may be turned to agitate the feed contained in the reservoir, which latter has a cover, I, hinged to it at $i$, or it may otherwise be fitted or held on its top, so that when the cover is closed the feed will not be thrown from the trough by the stirring action of the cylinder G. The cover also serves to keep the feed clean and to prevent animals from eating the feed except as it may be delivered to the trough at the proper times.

A series of bars, J, are arranged along each side of the trough. These bars are strongly connected at their tops to the reservoir C, and at their bottoms to the floor A, and come against or quite close to the upper edges of the sides of the trough, so that the bars serve to divide the feeding-space along the trough and separate the animals to prevent overcrowding at the trough, and the bars also serve as fenders to prevent the animals from climbing into the trough and wasting the feed. The bars also act as braces to the sides of the reservoir.

Other advantages of the improved feeder are, that the reservoir will hold a sufficient quantity of feed for two or three days' consumption, thereby saving time in preparing the feed, and the feed will be distributed to all the animals alike, and the feeder may be set quite close to the side of the pen or near the fence, so that the crank H and valve-handle F may be reached from outside the pen or fence to stir the feed and deliver it to the trough without requiring the attendant to stand among the animals to be fed.

The improved feeder will hold and pass to the trough any kind of slop or shelled or ground corn, or any small grains, as may be required.

I am aware that a receptacle provided with a valve in its bottom has been arranged above a feed-trough, and I therefore do not claim such invention.

Having thus described my invention, I claim as new and desire to secure by Letters Patent—

An improved hog-feeder consisting of the platform A, the feeding-trough B, supported above the platform, with the spaces $b$ along each side, the reservoir C, supported above the trough and provided with the sliding valve E in its bottom, the braces and fenders J, secured to the platform and reservoir, and the cylinder G, mounted in the said reservoir and provided with the teeth $g$ and the crank-handle H, substantially as herein shown and described.

HYLAND MANN CARTER.

Witnesses:
ADOLF FERRY,
JOSEPH GLASSER.